US012087149B2

(12) United States Patent
Ulleweit et al.

(10) Patent No.: US 12,087,149 B2
(45) **Date of Patent: *Sep. 10, 2024**

(54) HOME OCCUPANCY INFORMATION SYSTEM

(71) Applicant: J & M Creative Innovations, LLC, Orland Park, IL (US)

(72) Inventors: Michael L. Ulleweit, Orland Park, IL (US); Jeffrey A. Jablonski, Darien, IL (US); Matthew B. Sunday, California, KY (US); Joseph Althaus, Yellow Springs, OH (US); Blake J. Dalton, Centerville, OH (US); Michael O. Crowley, Butler, KY (US)

(73) Assignee: J&M Creative Innovations, LLC, Orland Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,135

(22) Filed: Mar. 8, 2023

(65) Prior Publication Data

US 2023/0222893 A1 Jul. 13, 2023

Related U.S. Application Data

(63) Continuation of application No. 17/678,242, filed on Feb. 23, 2022, now Pat. No. 11,626,007.

(60) Provisional application No. 63/174,300, filed on Apr. 13, 2021.

(51) Int. Cl.

*G08B 25/10* (2006.01)
*G08B 3/10* (2006.01)
*G08B 5/22* (2006.01)
*G08B 5/36* (2006.01)

(Continued)

(52) U.S. Cl.

CPC ........... *G08B 25/10* (2013.01); *G08B 3/1016* (2013.01); *G08B 5/223* (2013.01); *G08B 5/36* (2013.01); *G08B 21/22* (2013.01); *G08B 27/001* (2013.01)

(58) Field of Classification Search

CPC ...... G08B 25/10; G08B 3/1016; G08B 5/223; G08B 5/36; G08B 21/22; G08B 27/001

See application file for complete search history.

(56) References Cited

U.S. PATENT DOCUMENTS

| | | | | |
|---|---|---|---|---|
| 10,186,143 | B2 * | 1/2019 | Ali-Jarad | G08B 21/22 |
| 10,713,922 | B1 * | 7/2020 | Burke | G08B 21/22 |
| 11,462,095 | B2 * | 10/2022 | Mars | H04W 4/80 |

(Continued)

*Primary Examiner* — John A Tweel, Jr.

(74) *Attorney, Agent, or Firm* — Frost Brown Todd LLP; Vance V. VanDrake, III; Alexander J. Johnson

(57) ABSTRACT

A home occupancy status and information system may be used to track information about human and animal occupants within a structure, and provide information to first responders in the event of an emergency. A rescue beacon may be positioned near an entrance to a home, and when an audible alarm or alarm signal is detected by the beacon it will provide visual alerts and/or audible alerts to attract the attention of a first responder, and will provide information on occupants in the home, such as a number of pets, a number of humans, and other information. A rescue device may also be carried by each pet or other occupant in the house, which may be activated by a wireless signal from a rescue beacon, or by a detected alarm audio/signal. When activated, the rescue device will provide audible and/or visual alerts to aid first responders in locating the occupant.

20 Claims, 11 Drawing Sheets

(51) Int. Cl.
*G08B 21/22* (2006.01)
*G08B 27/00* (2006.01)

(56) References Cited

U.S. PATENT DOCUMENTS

| | | | | |
|---|---|---|---|---|
| 11,626,007 | B2 * | 4/2023 | Ulleweit | G08B 3/10 340/573.1 |
| 2013/0057401 | A1 * | 3/2013 | Rates | G08B 1/08 340/539.1 |
| 2015/0350848 | A1 * | 12/2015 | Eramian | H04W 4/029 455/404.2 |

* cited by examiner

HOME OCCUPANCY INFORMATION SYSTEM

CROSS REFERENCE TO RELATED APPLICATIONS

This application is a continuation of U.S. Non-Provisional patent application Ser. No. 17/678,242, filed on Feb. 23, 2022, and entitled HOME OCCUPANCY INFORMATION SYSTEM which itself claims the priority benefit of U.S. Provisional Patent Application 63/174,300 filed on Apr. 13, 2021, entitled HOME OCCUPANCY INFORMATION SYSTEM each of which is hereby incorporated herein by reference in its entirety.

FIELD

The disclosed technology pertains to a system for managing and providing status information to first responders or others visiting a home.

BACKGROUND

First responders such as firefighters, police officers, or emergency medical personnel often have limited information about a home and its occupants upon arrival. They may have basic details about an emergency that they are responding to, but those details may originate from a third party observer of the home and so may be inaccurate and/or incomplete. This lack of information can be dangerous for both residents and first responders. For example, firefighters responding to a fire emergency may be unaware of the number of occupants within the home, both presently and more generally (e.g., they may be unaware of the number of permanent residents at that address, as well as the number that are currently at the home and in need of rescue). As a result, they may lack critical information about which portions of the home to search, and when to discontinue a search.

The danger represented by incomplete information can be especially significant for pets within a home. A common phrase in fire services is "Risk a lot to save a lot, but risk little to save little," and the grim reality is that first responders are not expected to take great risk in order to rescue animals within a home. Thus, the emphasis during a rescue scenario is to prioritize human health and safety, and even after a rescue scenario there may be an emphasis on preserving property and/or preventing further damage rather than locating pets, especially where there is no information available indicating the presence of pets. Rescue scenarios may also be especially dangerous for some human occupants, such as geriatric, special need, disabled, and mobility challenged occupants, as well as children, as occupants within these groups may have a limited ability to participate in their own rescue (e.g., a special needs occupant may be in an unexpected location within the home, or may not respond to shouted queries).

What is needed, therefore, is an improved system for providing occupancy information to first responders and others.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Figure 1:
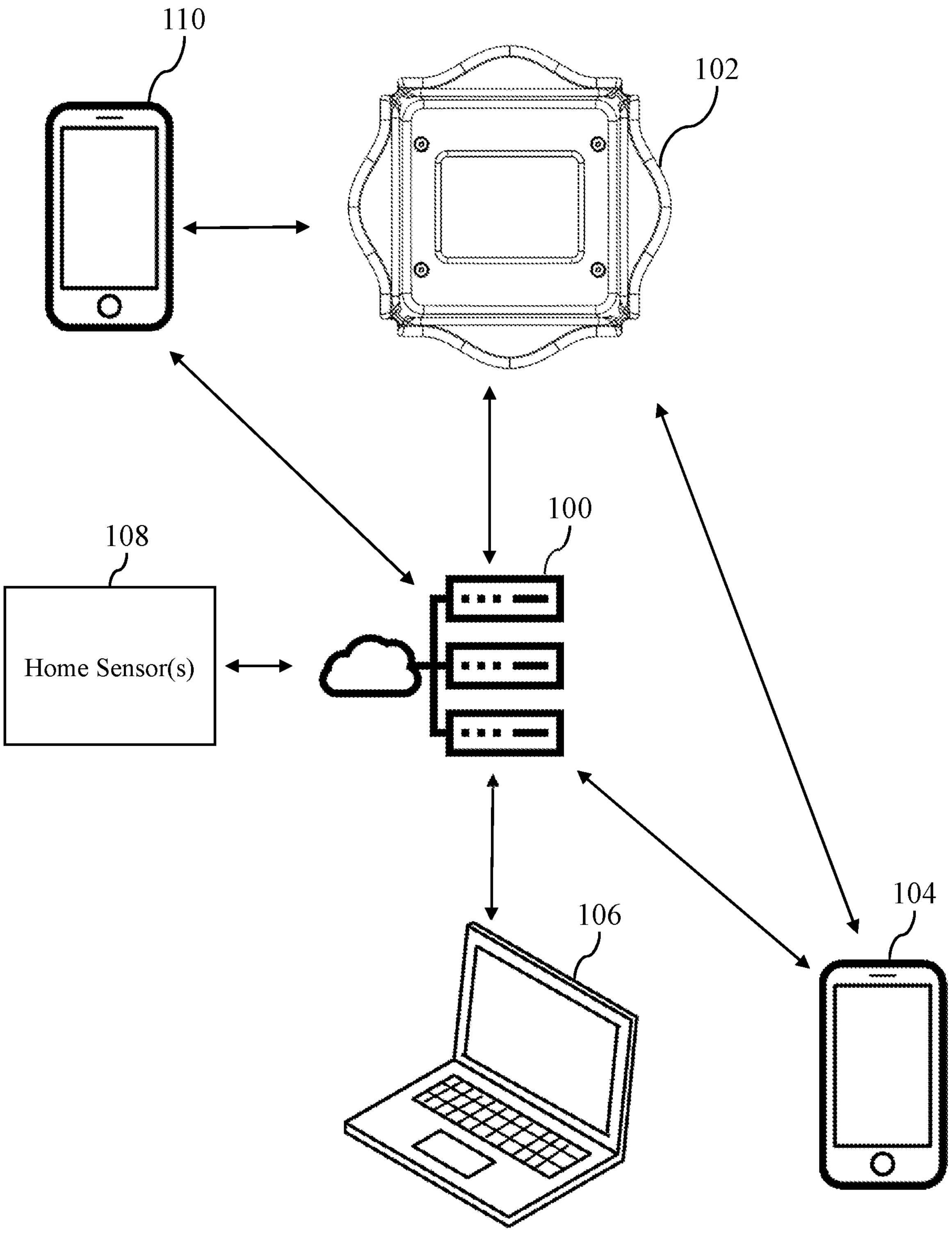
FIG. 1 is a schematic diagram of an exemplary system configured to provide information about the occupants of a home.

The inventors have conceived of novel technology that, for the purpose of illustration, is disclosed herein as applied in the context of home information and security systems. While the disclosed applications of the inventors' technology satisfy a long-felt but unmet need in the art of home information and security systems, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Implementations of the disclosed technology may be used to provide information to first responders and others arriving at a home that may aid in providing assistance to the occupants of the home. More particularly, some implementations of the disclosed technology may be used to provide information relating to the rescue of pets during an emergency scenario. Some implementations may include a pet or occupant rescue device that is tethered to the household's other detection and safety systems, and configured to provide first responders with high quality, current, and accurate information on the pets and other occupants within a home so that they can be rescued with minimal risk to first responders or others as opposed to going undiscovered.

Implementations of the disclosed technology may include hazard detectors, such as heat, smoke, carbon monoxide or other alarms, or may communicate with such devices via wireless communication or detection of audible alarms. Some implementations may include first responder beacons that receive wireless signals, or interpret or detect local hazard alarms, and that are configured to broadcast wireless communications, flashing strobes, audible alarms, or other information in response. The beacon may include a display, speaker, wireless transmitter, or other device configured to provide information to first responders arriving at a home such as the number of animal occupants, number of human occupants, or other special considerations relating to the home, and the visible and audible alerts from the beacon may attract a first responder's notice and cause them to interact with the device.

Information provided by the beacon may be stored locally to the device, may be transmitted to the device from another device, may be displayed by the device, may be accessible through a web service or software application on a first responder's device, or may be accessible in other ways. As an example, a QR code, RFID code, or other code associated with the beacon may be scanned by a first responder device to access such information at web location, or receive the information via a software application. Information may be updated in real time based upon manual updates received from homeowners, automated updates received based upon GPS or other sensor information from a homeowner's user device, or automated updates from other sensors and devices within the home.

As one example, where a carbon monoxide detector in a home is activated, the beacon or a device in communication with the beacon may detect the external alarm and notify the homeowner via their configured user device (e.g., a smartphone). The homeowner may respond to the notification indicating whether they are currently at the home, and whether any other humans or animals are currently at the home. A first responder arriving at the home may see the beacon (e.g., positioned near the front door), and may interact with the beacon to determine the number of occupants that may be in the home (e.g., the beacon may display status information for occupants based on pre-configured data and the homeowner's response). In this example, the first responder may receive dynamic information describing the current occupants of the home, while in a conventional first responder scenario those occupants would remain unknown, which may influence the first responder's behavior. For example, where an initial search of a home indicates there are no current human occupants, but information from a beacon indicates one or more animal occupants, the first responder may perform a deeper search of the home for the identified pets instead of ceasing their search and waiting for the homeowners to return.

Some implementations of the disclosed technology may also include rescue tags that may be attached to an animal or carried by human occupants of the home. Rescue tags may be configured unidirectional or bidirectional communication with other devices of the rescue system, and may be configured to provide visual and audible alarms when activated, or may be configured to provide location information as part of a beacon triangulation or other tracking system. Some implementations of the disclosed technology may also include hub devices, triangulation or tracking devices, and more generalized hazard recognition devices, as will be described in more detail below.

Turning now to the figures, FIG. 1 is a schematic diagram of an exemplary system configured to provide information about the occupants of a home. A user device 104, 106) may be, for example, a computer, tablet, smartphone, or other computing device, and may be in communication with a remote server (100) over a network connection (e.g., a LAN, WAN, or cellular network). The user device (104) may also be in communication with a rescue beacon (102) via a wireless or wired connection, such as by Wi-Fi, Bluetooth, NFC, RFID, USB, or other communication channel. A user may interact with and configure the rescue beacon (102) or other related devices via their user device (104, 106) through a remote server (100) that is configured to push changes out to connected devices such as the rescue beacon (102), or through a direct connection to the rescue beacon (102) via Wi-Fi, Bluetooth, or other communication interface.

One or more other sensors (108) of the home may also be in communication with other devices via the remote server (100). In some implementations, the other sensors (108) may be in direct communication with other devices via a local network or local wireless communications, and may also be in indirect communication with those devices via unidirectional detection (e.g., an audible smoke alarm may be detected by the rescue beacon (102)).

A first responder device (110) may be, for example, a smartphone or other computing device, and may be configured to interact with the first responder beacon (102) and/or the remote server (100) to gain information relating to the home. This may include information stored locally on the rescue beacon (102), or information provided by the remote server (100). As example, the first responder device (110) may include a software application that automatically retrieves information from the rescue beacon (102) via Bluetooth when it is within a detectable range, or may include a scanning application that is configured to receive an identifier from the rescue beacon (102) and access occupancy information at a website or other web location using the scanned identifier.

It should be understood that the system shown in FIG. 1 is exemplary, and that this disclosure contemplates varying implementations that may include fewer components, or more components than those shown in FIG. 1 (e.g., a simple implementation may include only a rescue beacon (102) configured to audibly detect alerts from other sensors (108)).

Figure 2:
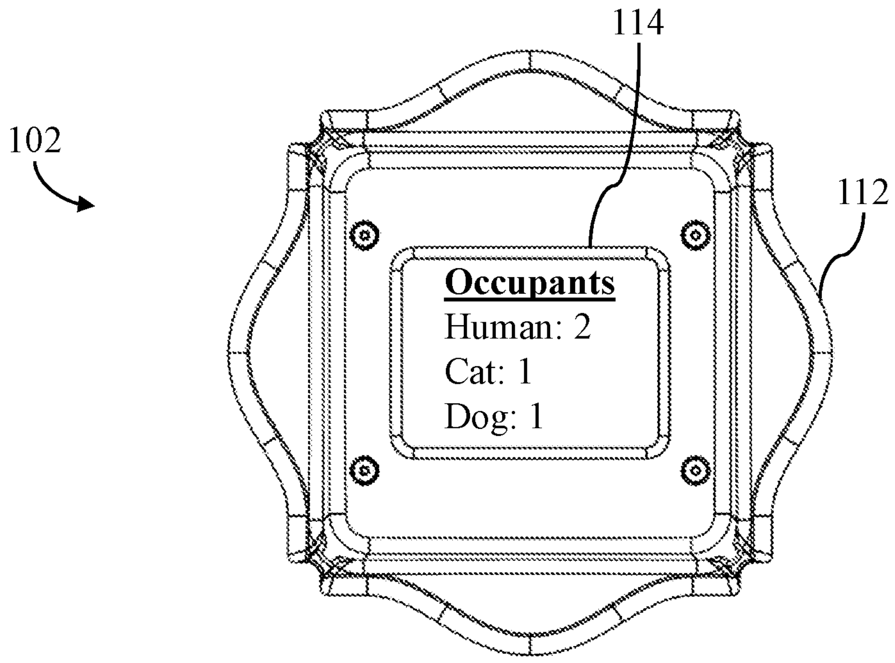
FIG. 2 is a front elevation view of an exemplary rescue beacon.
Figure 3:
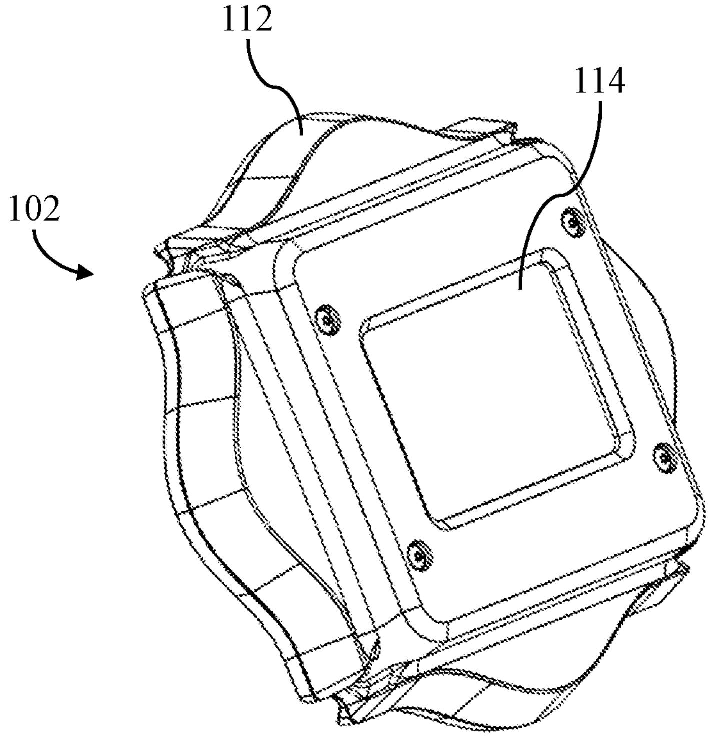
FIG. 3 is a front perspective view of the rescue beacon of FIG. 2.
Figure 4:
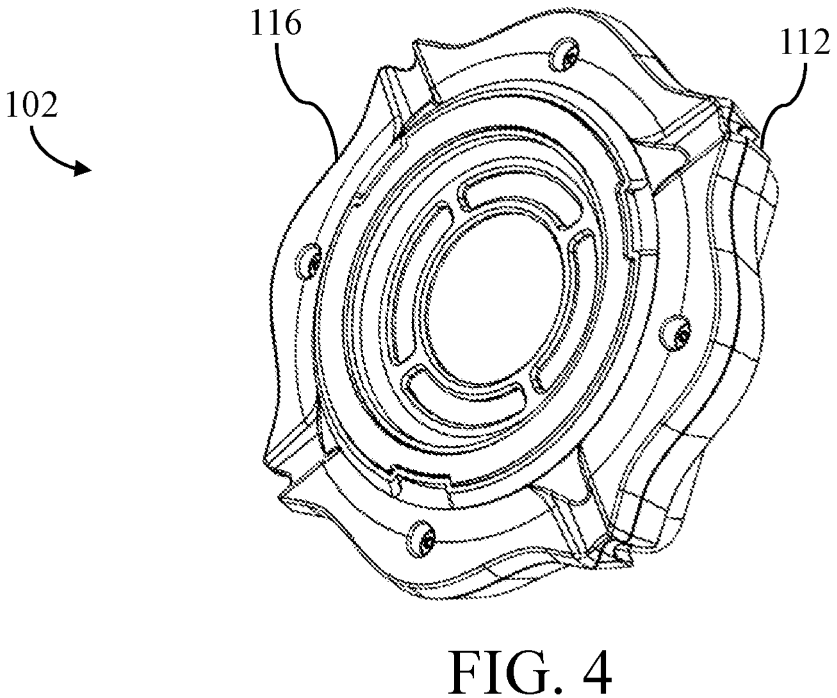
FIG. 4 is a rear perspective view of the rescue beacon of FIG. 2.

FIGS. 2 and 3 show frontal views of the rescue beacon (102). A case (112) may be hardened/shielded against environmental factors likely to be encountered during a rescue scenario (e.g., heat, smoke, water, drop impact). A display (114) is partially enclosed within the case (114), and may be, for example, an LCD, LED, or other visual display, and may in some implementations include touchscreen capability, or other user interface devices (e.g., physical buttons or knobs may be positioned near or on the display to accommodate the potential of a first responder's gloved hands). FIG. 4 shows a rear view of the rescue beacon (102), where a mounting ring (116) can be seen on the rear of the case (112). The mounting ring (116) may be configured to removably mount the rescue beacon (102) to a surface where it is conveniently available during an emergency or other scenario. The mounting ring (116) may use one or more of adhesives, mechanical fasteners, suction elements, hangers, or other means for coupling the rescue beacon (102) to a surface such that it can be purposely removed for use.

Figure 5:
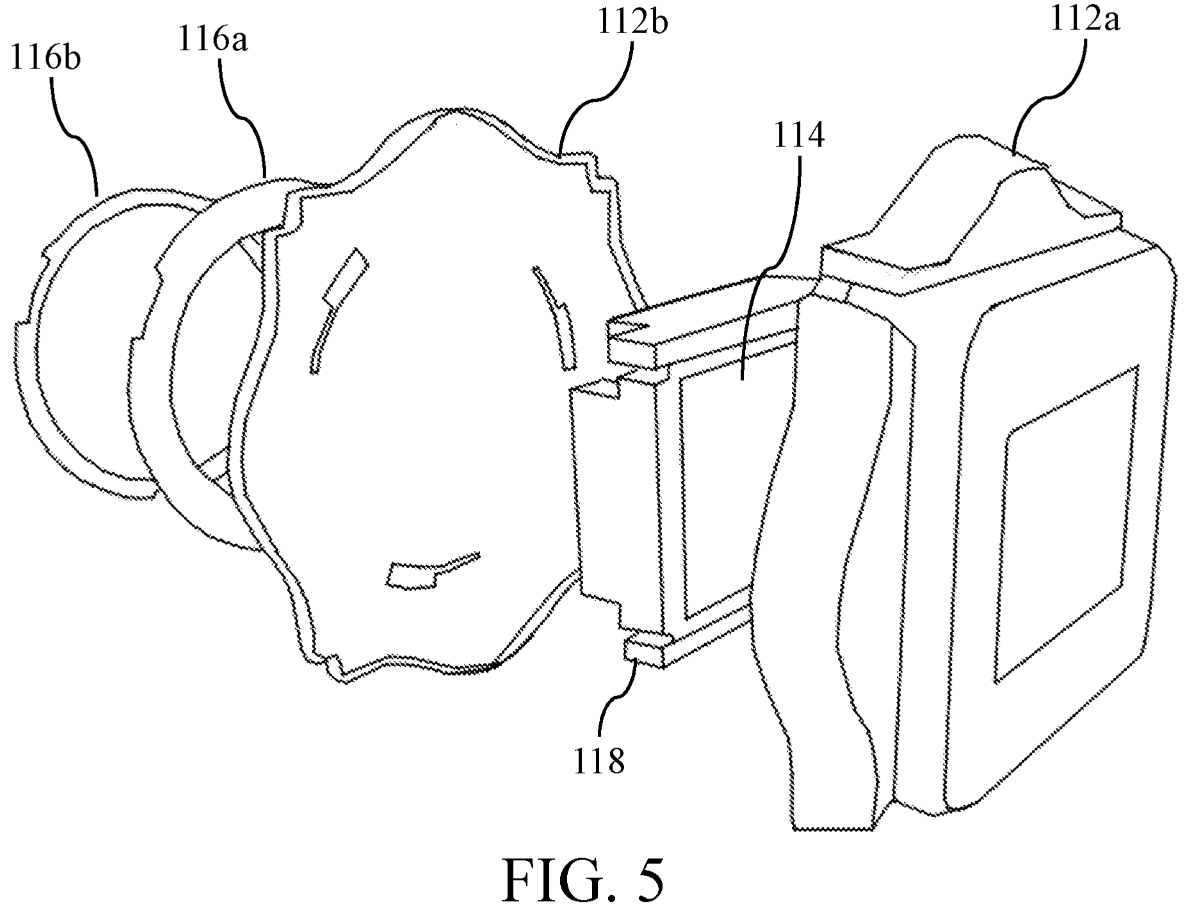
FIG. 5 is an exploded view of the rescue beacon of FIG. 2.

FIG. 5 is an exploded view of the rescue beacon (102), where it can be seen that a structural ring (116*a*) of the mounting ring (116) is adapted to rotatably couple to a rear portion (112*b*) of the case (112) using a set of slot and key features. An adhesive ring (116*b*) couples with the structural ring (116 *a*) to form the mounting ring (116), while the rear portion (112*b*) couples to a front portion (112*a*) to form the case. A control module (118) includes the display (114) and is encased by the front and rear portions (112*a*, 112*b*) when assembled. The control module (118) may also include a processor, memory, power supply, communication device, and other components.

Figure 6:
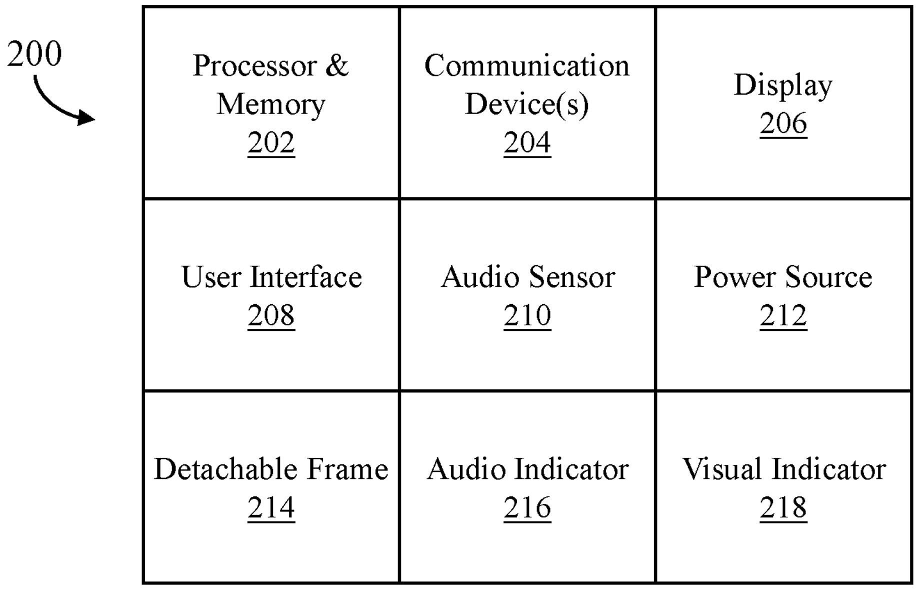
FIG. 6 is a grouping of components, functions, and features of an exemplary rescue beacon.

As an example, FIG. 6 is a diagram of a rescue beacon (200) such as that shown in FIGS. 2-5. The rescue beacon includes a case having a detachable frame (214) that allows the beacon (200) to be removably mounted to a surface when not in use. A processor and memory (202) may be configured to store and execute instructions relating to operation of the beacon (200), as well as to store and manipulate information related to occupants of the home, which may be received from the remote server (100), the user device (102), or other sources. A power source (212) may be one or more of a fixed, rechargeable, removable, or replaceable battery, or a fixed power connection or power cable suitable for coupling the beacon (200) to a home's electrical infrastructure.

One or more communication devices (204) may be included, such as wireless transceivers or receivers (e.g., Wi-Fi, Bluetooth, or other signal), data ports (e.g., USB, Ethernet), or other devices allowing for the exchange of information. A display (206) and user interface (208) (e.g., touchscreen capable display, touch sensitive surface, button) may be configured to visually display information to a user, and receive inputs from the user, respectively. User inputs may be for providing information to the beacon (200) on occupancy, configuring the beacon's (200) behavior and other options, or activating/deactivating some feature of the beacon (200).

The beacon (200) includes an audio sensor (210) (e.g., a microphone) that is configured to detect audible alarms from other devices within the home (e.g., external smoke, heat, carbon monoxide, and other hazard alarms). Hazard alarms detected by the audio sensor (210) may be used by the processor (202) to change the operational status and/or activate other features of the rescue beacon (200), as will be described in more detail below. The beacon (200) may also include one or both of an audio indicator (216) and visual indicator (218). An audio indicator may be a speaker or other electrical audio source configured to generate audible noises, voices, chirps, alarms, or other sounds. The visual indicator (218) may also be the display (206), or may be a separate set of LED indicators or other lighted visual indicators. The processor (202) may be configured to operate the visual indicator (218) and/or audio indicator (216) under certain conditions, such as upon detection of an external hazard alarm, to cause the beacon (200) to be more readily identifiable and interacted with by a first responder or other person.

Figure 7:
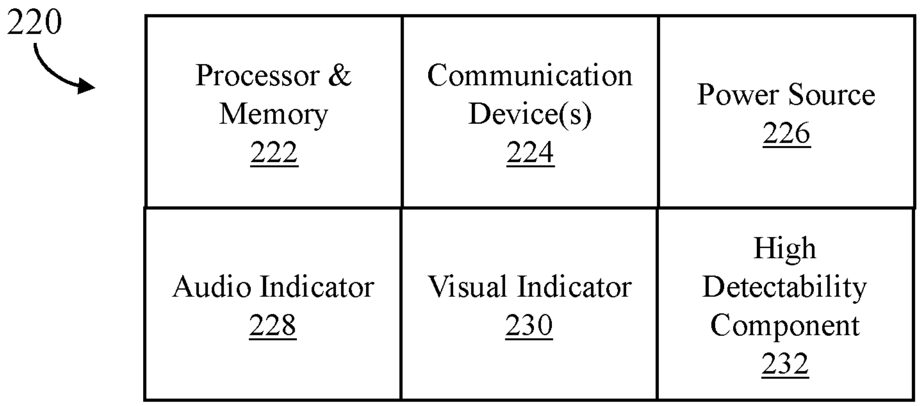
FIG. 7 is a grouping of components, functions, and features of an exemplary rescue tag.

FIG. 7 is a diagram of a rescue tag (220), which may be affixed to or integrated with an animal's collar, or may be carried or worn by a human occupant. While not all implementations of the disclosed technology will include a rescue tag (220), those that do may provide additional features and functionality to aid in locating and rescuing occupants. The rescue tag (220) may include a processor and memory (222), one or more communication devices (224), a power source (226), an audio indicator (228), and a visual indicator (230), each having characteristics similar to those discussed above in the context of FIG. 7.

The audio indicator (228) and visual indicator (230) may be activated by the processor (222) in response to the rescue tag (220) receiving a signal (e.g., wireless signal from a rescue beacon or other device) indicating an emergency scenario, or may be activated in response to audible detection of an emergency scenario (e.g., as detected by an audio sensor). When activated, these indicators may provide audible and/or visual notice of the location of the rescue tag, which may aid a potential rescue of the occupant in possession of the rescue tag. The audible and visual alerts provided by a rescue tag (220) may be distinct from those provided by a rescue beacon (200) in order to prevent confusion (e.g., the rescue beacon (200) may flash a red light and/or broadcast a speech audio alert instructing a first responder to take possession of the device, while the rescue tag (220) may flash a white light and/or broadcast a persistent chirping tone). The rescue tag (220) may also include one more additional high detectability components (232) that may aid in its location during an emergency scenario. This may include reflectors and/or thermal components configured to be especially visible to thermal scanning and imaging devices that are used during rescue scenarios, and may also include bright colors (e.g., lime green, safety orange), chevrons, photo luminescent materials, and other materials and/or designs.

In some implementations, a homeowner may interact directly with a rescue device such as a beacon or hub to set a status update indicating whether one or more pets or human occupants are presently in the house, which may be done prior to an emergency, or in response to an emergency notification. The system may also interact with a user via the user device (104) to solicit such information at various times, such as by requesting that the homeowner provide such information in response to a GPS signal from the user device (104) indicating the owner is present at a grocery store, dog park, veterinarian, or other location.

In some implementations, information provided for animal occupants via a rescue beacon or status dashboard may include, for example, pet name, species, breed, images of the pet, pet size and weight, pet medical conditions, favorite hiding spots, and pre-recorded audible summons from an owner of the pet that may be audibly relayed by a first responder to aid in locating the pet. In some implementations, information provided for human occupants via a rescue beacon or status dashboard may include, for example, name, a picture, known medical conditions, a location within a residence that is their bedroom or primary room of occupant, or other information. Other information available via the dashboard may include, for example, a passkey or code that is usable with an electronic lock to access the location, or other instructions for accessing the location.

As has been described, an exemplary use of the disclosed technology is position one or more rescue beacons near the home (e.g., outside one or more doors, near a mailbox, on a wall just inside a door of the home) where they will be visible to a first responder. The beacon is activated during an emergency, visibly and/or audibly drawing the first responder's attention and inviting interaction. The first responder may remove the beacon from its mounting surface and interact with the beacon to gain information on the occupants (e.g., viewing a visible display, viewing a sequence of flashing lights indicating a number of occupants, scanning a QR code to access a web-based dashboard of information). The first responder may keep possession of the beacon as they respond to hazards and/or provide search and rescue efforts. While in the first responder's possession, the beacon may provide static information on occupants, or may provide updated information as it becomes available from other devices (e.g., rescue tags, triangulation systems) or from the homeowners themselves (e.g., by a response to a notification of an emergency and request to confirm any animal or human occupants present in the home). As further example, FIGS. 8A through 11B provide examples of several additional implementations possible with the disclosed technology.

Figure 8A:
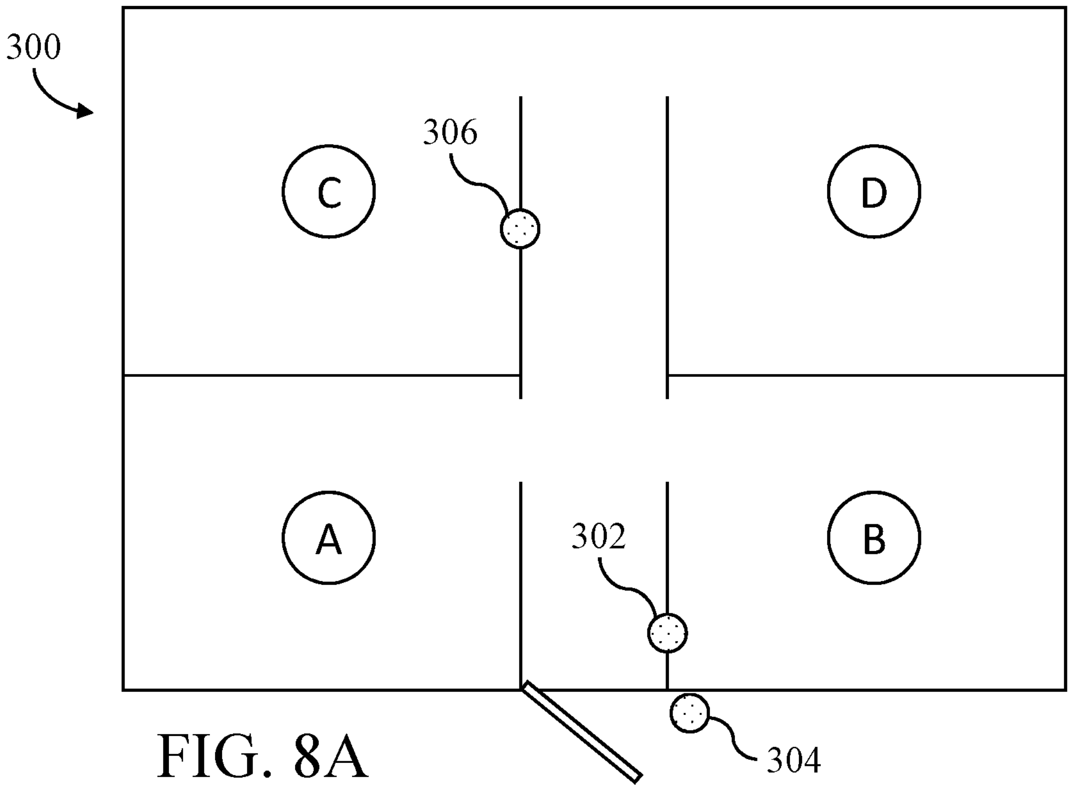
FIG. 8A is a schematic diagram of an implementation of an exemplary occupancy information system at a location.

FIG. 8A is a schematic diagram of one implementation of an occupancy information system at a location (300). The location includes four different rooms labeled A-D, and a hallway connecting an entrance to each of the four rooms. A rescue beacon (302) is positioned just inside the entrance, and may be mounted to a wall, placed on a table, or otherwise positioned. A rescue beacon (304) is also positioned just outside the entrance, and may be mounted to an exterior of the home, hung from a mailbox, or otherwise positioned. Two beacons (302, 304) are not required, and are merely illustrated to show different locations at which a beacon may be placed. An external alarm (306) is positioned in the hallway, and may be, for example, a smoke alarm, heat alarm, carbon monoxide alarm, or other hazard alarm configured to detect an unsafe condition and provide an audible alarm and/or transmit a wireless signal in response.

Figure 8B:
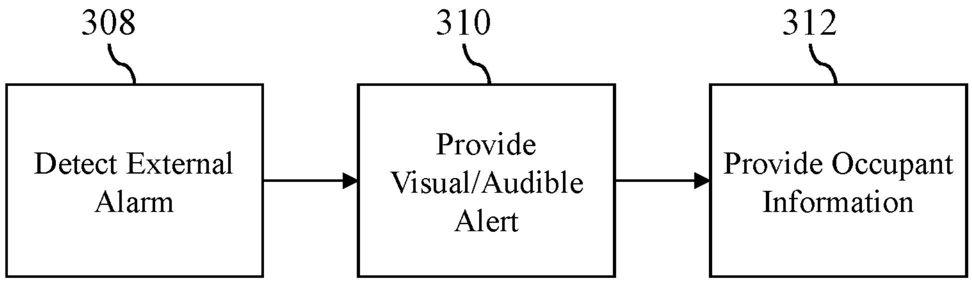
FIG. 8B is a flowchart of a set of steps that could be performed with the occupancy information system of FIG. 8A to provide information on occupants at the location.

FIG. 8B is a flowchart of a set of steps that could be performed with the occupancy information system of FIG. 8A to provide information on occupants at the location (300). One or more of the beacons may detect (308) the presence of an alarm condition from the external alarm (306), which may include an audio sensor detecting an audible alarm, or a wireless receiver receiving a signal indicative of the alarm, as has been previously described. In response, the one or more beacons may begin to provide (310) visual alerts, audible alerts, or both, and may also begin to provide (312) occupant information, as has been described. As an example, this may include each of the beacons (302, 304) intermittently flashing a light to alert a first responder arriving at or entering the home. Providing (312) occupant information may include flashing a light indicator in a sequence indicating the number of occupants, displaying a number of occupants via a display, announcing the number of occupants via an audible indicator, or providing a QR code that may be scanned with the first responder device (110) to access the information at a web location, for example.

In the above example, a first responder may take possession of a beacon and remove it from the location where it is placed or mounted, and may refer to the beacon for information while at the home. The first responder may note that the beacon flashes a sequence of lights indicating the presence of 2 animals in the home (e.g., or may view such information via an LED display, hear such information broadcast via a speaker, or otherwise), and may cease searching for animals once 2 animals have been found.

Figure 9A:
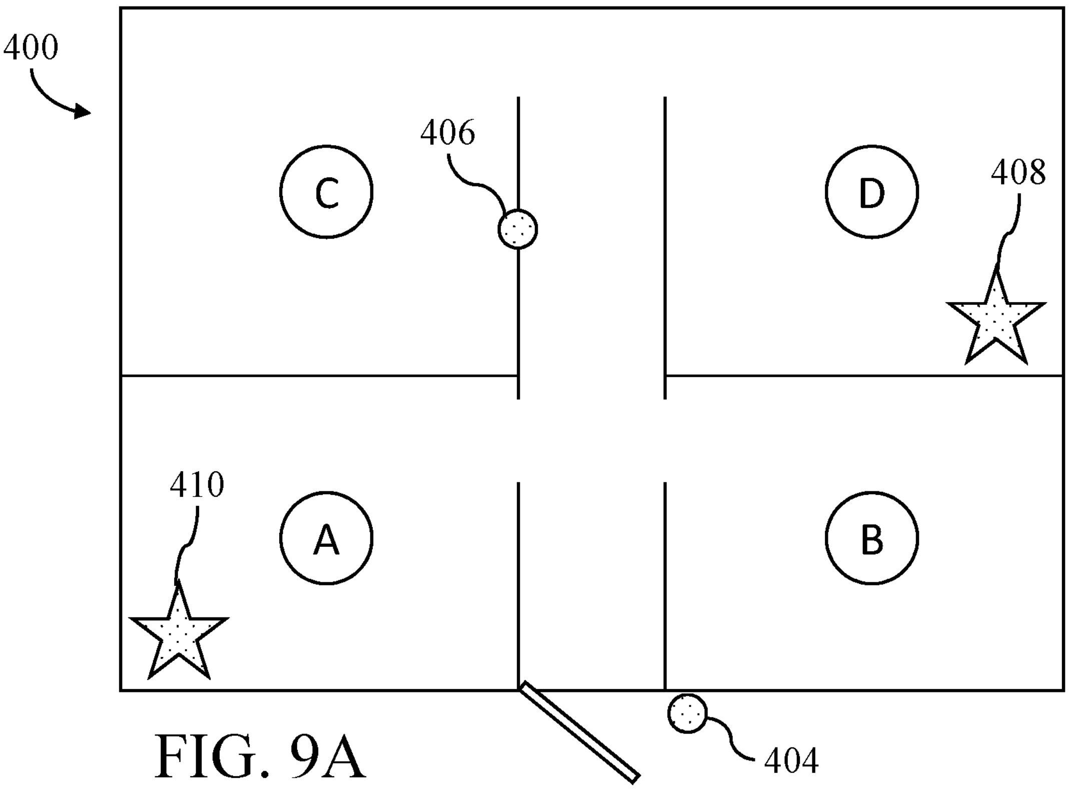
FIG. 9A is a schematic diagram of an implementation of another exemplary occupancy information system at a location.

As another example, FIG. 9A is a schematic diagram of another implementation of an occupancy information system at a location (400), which itself is structurally similar to the location (300). A rescue beacon (404) is positioned outside the home where an arriving first responder is likely to notice it. An external alarm (406) is positioned in the hallway, and may be any type of hazardous condition alarm (e.g., smoke, heat, CO). Each of 2 occupants at the home (e.g., human occupants, pets) is in possession of a rescue tag (408, 410).

Figure 9B:
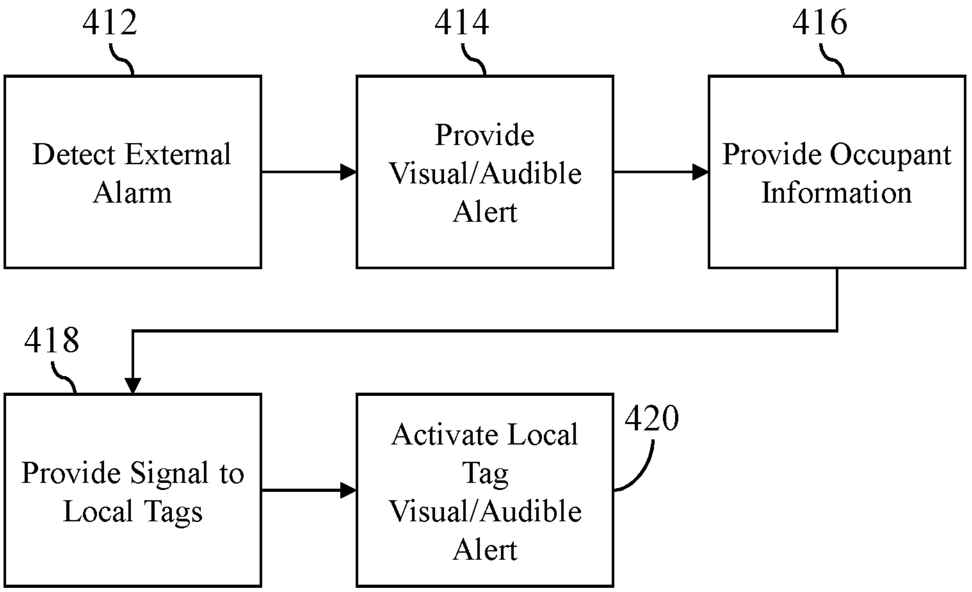
FIG. 9B is a flowchart of a set of steps that could be performed with the occupancy information system of FIG. 9A to provide information on occupants at the location.

FIG. 9B is a flowchart of a set of steps that could be performed with the occupancy information system of FIG. 9A to provide information on occupants at the location (400). An external alarm may be detected (412) by one or more rescue beacons such as the rescue beacon (404), which may include detecting an audible alarm, wireless signal indicative of alarm, or otherwise. The detecting beacon (404) may provide (414) visual and/or audible alerts in varying ways, as have been described, and may also provide occupant information (416) in varying ways, as have been described. The beacon (404) may also transmit (418) a wireless signal to any nearby rescue tags, such as the rescue tags (408, 410). Each rescue tag (408, 410) receiving the signal is configured to respond by activating (420) a local audible alert, visual alert, or both. In some implementations, the rescue tag (408, 410) may itself be configured to detect the audible alarm and/or other alarm signal, and may be able to self-trigger alerts (420) instead of, or in addition to, being triggered by another device. In the shown example, this will cause the rescue tag (408) in room D to begin flashing a light and/or providing an audible cue of its location, and will cause the rescue tag (410) in room A to do the same.

During an emergency in the above implementation, a first responder may obtain the rescue beacon (404) as has been described, and during a search of each room in the house may be drawn to the visual and/or audible cues from the rescue tags (408, 410) in rooms A and D respectively, and so has an improved chance of identifying which rooms to search more extensively, and which locations of those rooms to focus their search in for a human or animal occupant.

Figure 10A:
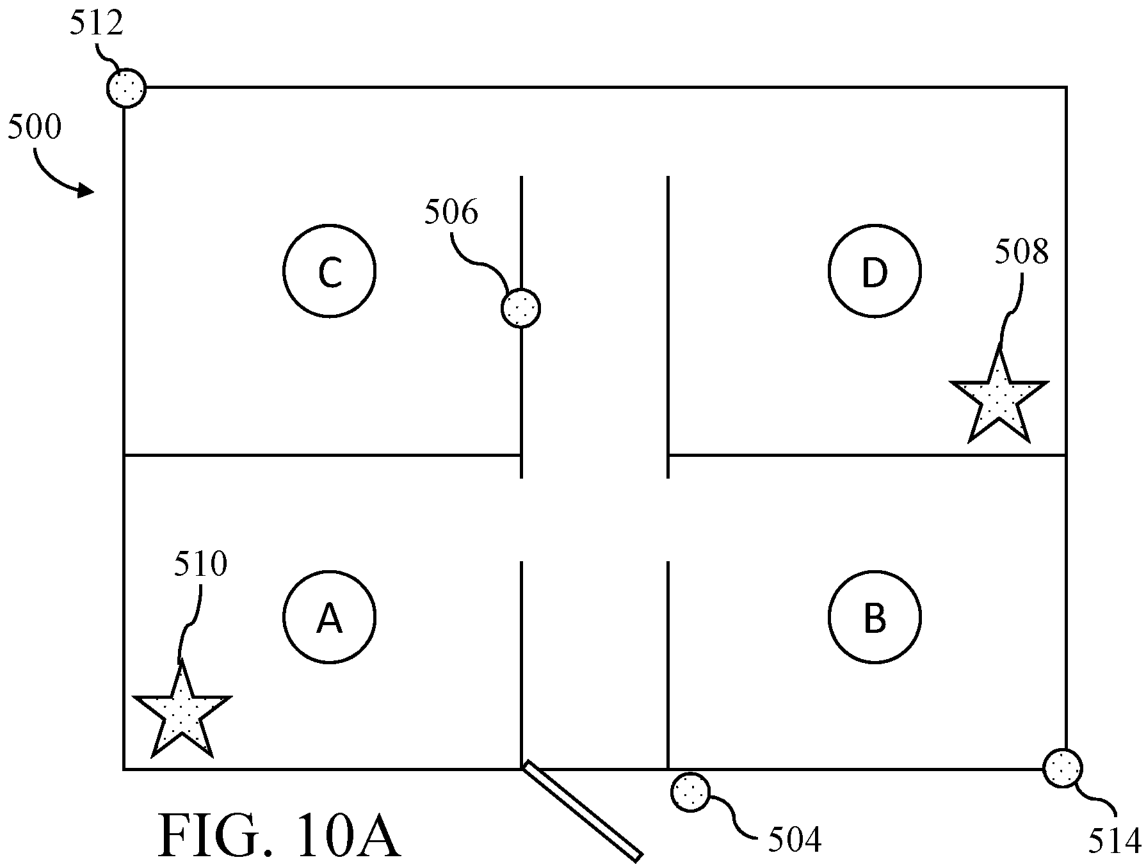
FIG. 10A is a schematic diagram of an implementation of yet another exemplary occupancy information system at a location.

As another example, FIG. 10A is a schematic diagram of another implementation of an occupancy information system at a location (500), which itself is structurally similar to the location (300). A rescue beacon (504) is positioned at the entrance of the home, an external alarm (506) is positioned in the hallway and configured to provide audible and/or signal based responses to hazardous conditions, and each of 2 occupants in the home (e.g., human or animal) is in possession of a rescue tag (508, 510). The location (500) also includes a first and second triangulation beacon (512, 514) placed at separate locations throughout the home. Where the location (500) includes two or more triangulation beacons, the system may be configured to provide actual location tracking information for each of the rescue tags (508, 510).

This may be accomplished by, for example, with each rescue tag (508, 510), tracking the strength and direction of received signals that are transmitted from the triangulation beacons (512, 514) and creating, over time and during non-emergency situations, a virtual mapping of detected signal characteristics when the rescue tag is positioned at different positions within the location (500). During an emergency situation, this virtual mapping can be used to provide quick estimates of the rescue tag's current position within the location (500).

Figure 10B:
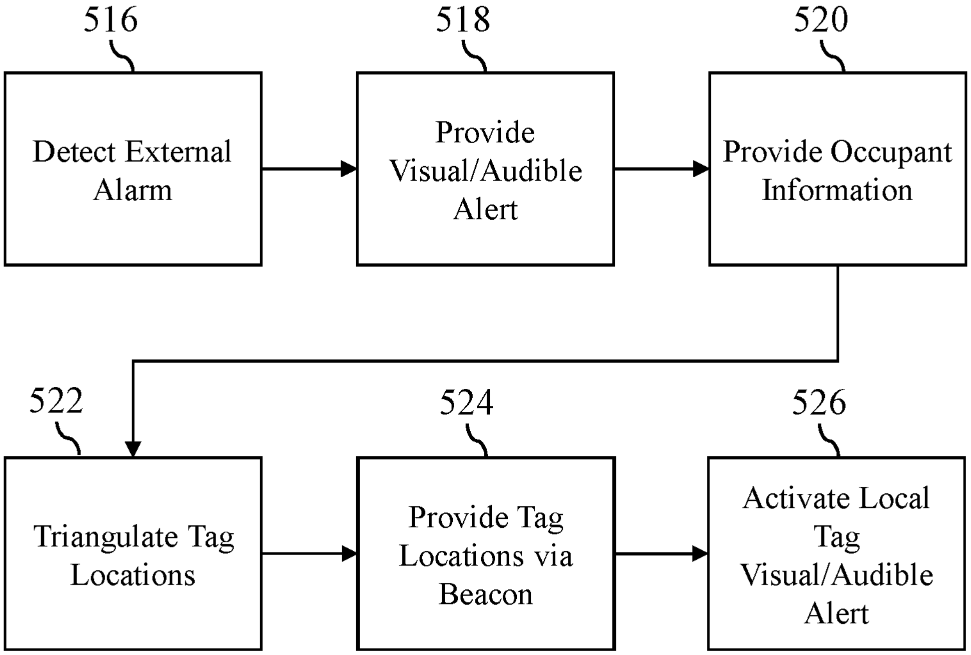
FIG. 10B is a flowchart of a set of steps that could be performed with the occupancy information system of FIG. 10A to provide information on occupants at the location.

FIG. 10B is a flowchart of a set of steps that could be performed with the occupancy information system of FIG. 10A to provide information on occupants at the location. When an external alarm is detected (516) (e.g., an audible alarm or alarm signal, as has been described), the beacon (504) may provide (518) audible and visual alerts, and may provide (520) occupant information, as has been previously described. The system may then triangulate (522) the locations of one or more rescue tags, which may include one or more beacons, rescue tags, or other devices of the system using a signal mapping or other lookup table to estimate a position of each rescue tag based on currently detected signals. With rescue tag locations determined, such information may be transmitted to the rescue beacon (504), a first responder device (110), or another device, and may be used to provide (524) real time tracking of rescue tag locations. This may include displaying, via the rescue beacon (504) tracking information, which may include direction and distance indications, or may include a visual representation of the location (500) with overlaid positions of rescue tags. The system may also activate (526) visual and/or audible alerts locally for each rescue tag, which may include transmitting a signal from the rescue beacon (504) or another device to activate local alerts, or may include the rescue tags (508, 510) themselves self-activating such alerts, as has been described.

Figure 11A:
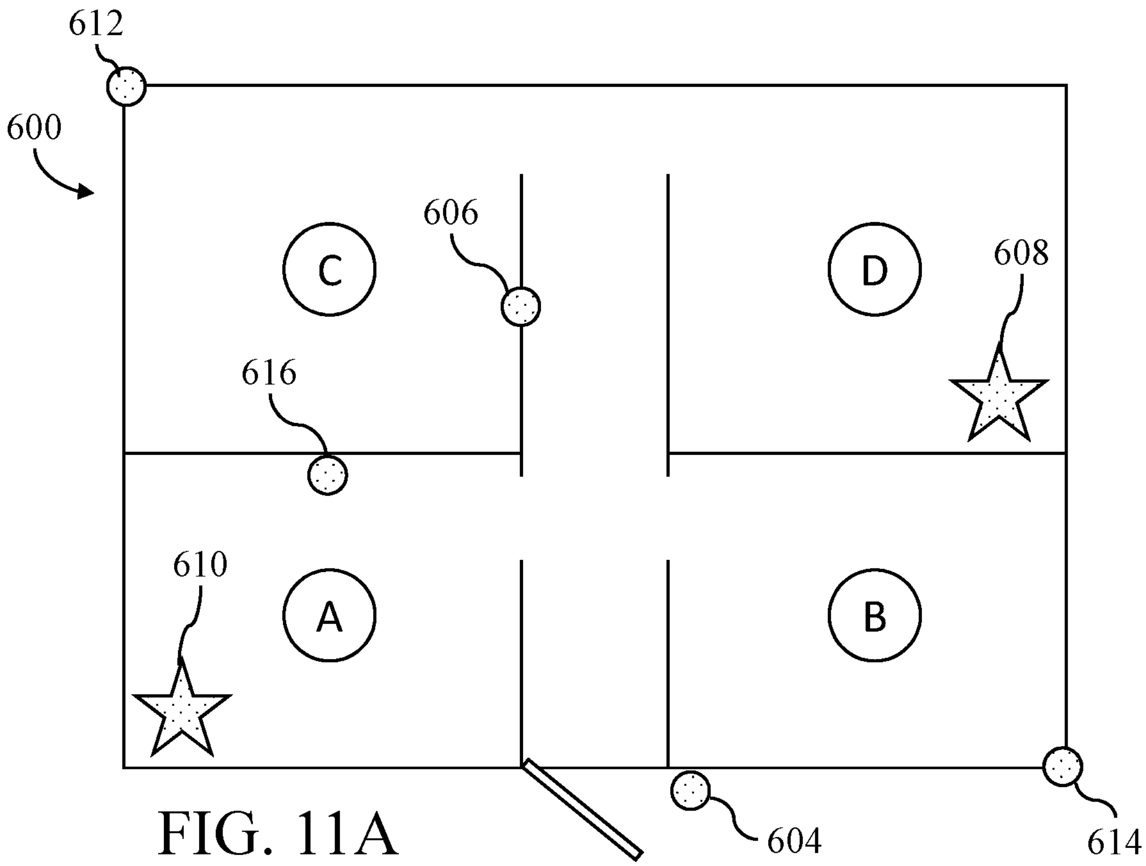
FIG. 11A is a schematic diagram of an implementation of yet another exemplary occupancy information system at a location.

FIG. 11A is a schematic diagram of another implementation of an occupancy information system at a location (600). A rescue beacon (604) is positioned at the entrance, an external alarm (606) is positioned in the hallway, rescue tags (608, 610) are associated with each of 2 occupants (e.g., human or animal) in the location (600), triangulation beacons (612, 614) are distributed across the location (600), and a rescue system hub (616) is positioned in room A. The rescue system hub (616) may be, for example, a wireless communication hub capable of receiving and transmitting various wireless communications, and may be configured to provide communications between the remote server (100) and other devices, and may also be configured to assist with triangulation of rescue tags (608, 610), as has been described. The rescue system hub (616) may be configured to receive and interpret signals from various other devices across a variety of communication types, and may be configured to manage communication across devices specific to the rescue system using one or more communication types (e.g., Wi-Fi, Zigbee, ZWAVE, and other signals may be received by the hub, which may communicate with beacons and rescue tags using only Zigbee).

Figure 11B:
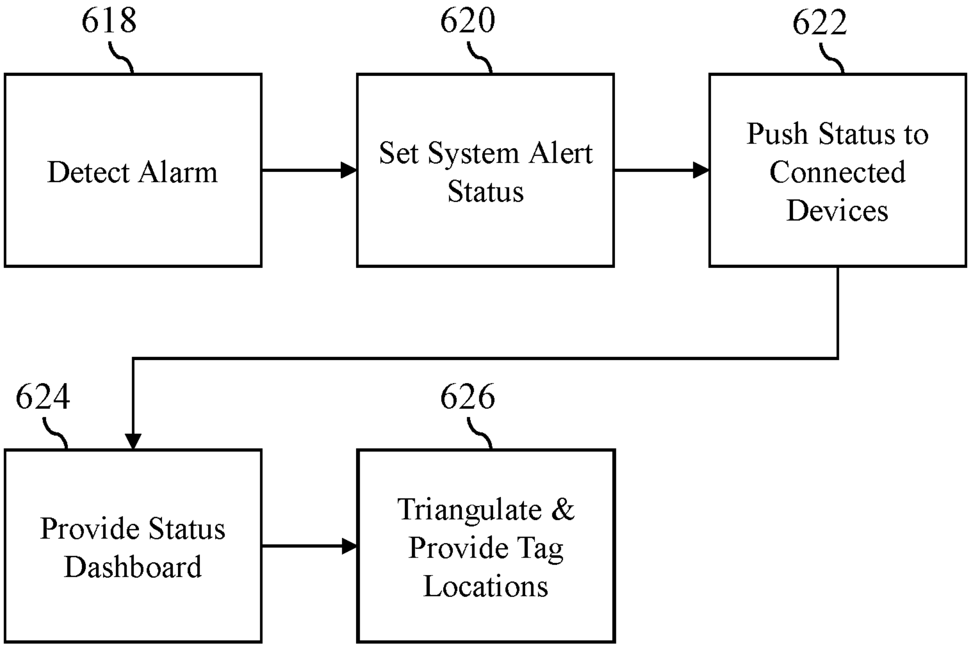
FIG. 11B is a flowchart of a set of steps that could be performed with the occupancy information system of FIG. 11A to provide information on occupants at the location.

FIG. 11B is a flowchart of a set of steps that could be performed with the occupancy information system of FIG. 11A to provide information on occupants at the location (600). When an alarm is detected (618) by the hub (616) or another device in communication with the hub (616), the system may be placed into an alert status (620) and may push (622) the alert status to all connected devices, causing any communicatively coupled devices such as rescue beacons and rescue tags to respond accordingly (e.g., with visual and/or audible alerts). The hub (616) may also begin to provide (624) real-time information to a status dashboard associated with the location (600), which may be accessible by the user device (104), first responder device (110), or other devices at a web location. The system may also triangulate (626) and provide the positions of rescue tags (608, 610), as has been described. Information provided (624) via the status dashboard may also be pushed to and displayed on connected device, such as the rescue beacon (604), and may be stored locally on each device so that it remains accessible in the event of a failure of a wireless LAN or other network.

Additional variations exist, and so additional implementations are possible and will be apparent to those skilled in the art in light of this disclosure. In some implementations, any device configured to detect an external alarm (e.g., a rescue beacon, rescue tag, or rescue system hub) may be configured for each alarm type by testing those modes and programming each associated alarm using the user device (104) or another device in communication with the programmed device, such that each alarm type (e.g., smoke, carbon) and external alarm output (e.g., a particular audible tone or wireless signal) may be associated with an alarm profile so that it may be recognized and reacted to in the future. As an example, the user device (104) may be placed into a training mode where each of a smoke alarm tone and a carbon monoxide alarm tone are sampled and associated with those hazards. Once a rescue beacon (102) is programmed based upon this association, it may provide red indicator lights in response to a detected fire, or green indicator lights in response to a detected carbon monoxide hazard. The rescue beacon (102) or other device may operate in a low power state where the only performed function is audio sampling (e.g., rolling shutter style sampling, or other types), and may wake into a fully featured normal state when sampled audio matching a configured alarm is detected.

In some implementations, wireless communications between rescue devices may be accomplished via LoRaWAN, Zwave, Zigbee, or other lightweight wireless protocol that does not rely on the stability or availability of a local Wi-Fi network or other network that may be compromised during an emergency.

In varying implementations, external alarms, hazard alarms, and alarms or sensor capabilities that may be integrated with rescue devices may be, for example, heat detectors, smoke alarms, carbon monoxide detectors, and others. Alarms that may advantageously function with the disclosed system include heat detectors capable of detecting sudden changes in temperature indicative of a fire, ionization smoke alarms capable of detecting smoke due to interference with an ionic field, photoelectric smoke alarms capable of detecting smoke due to the reflection or deflection of light, combination alarms that include multiple similar or different capabilities (e.g., ionization and photoelectric combined detectors), carbon monoxide alarms, and others.

While much of the disclosure has related to first responder use and rescue scenarios, it should be understood that implementations of the disclosed technology may be more broadly used to gather, store, and provide information on homes and home occupants to first responders, visitors, short term renters, and others through interaction with rescue beacons and other devices. The same system and devices may also provide benefits during rescue scenarios, as has been described.

As one example, a residential property used for short term rentals might include an occupancy information system such as those described in FIGS. 8A-11B. The system may provide first responder and emergency scenario rescue features such as those described above, including providing information on occupants to first responders via a rescue beacon, rescue tag, mobile application web portal, or otherwise. In non-emergency scenarios, the system may be used to provide information to occupants staying in the short term rental, as well as caretakers or cleaners providing services to the short term rental.

Conventionally, the owner of the short term rental might share information with renters or caretakers via printed papers posted at the property, or via email, text message, or other communication service. These approaches are often ineffective due to changes in information (e.g., previously posted information may become inaccurate due to a subsequent change), loss or damage to the posted paper, or unavailability of communication services (e.g., especially at remote locations where communication networks may be unreliable or unavailable).

Using implementations of the disclosed occupancy information system, renters and caretakers may instead access information via interaction with a rescue beacon or other device, which may include viewing or receiving information directly from the beacon, or receiving data from the beacon that is usable to view the information on a web portal or another software application via a smartphone (e.g., by scanning a QR code, RFID transmitter, NFC transceiver or other wireless data provider). Information may be stored on such devices, and stored information may be remotely updated by the property owner and pushed down to one or more devices of the devices system via a local network or hub device (e.g., the system hub 616). In this manner, when information changes the owner may update the information sources remotely, instead of printing and posting new informational materials at the property.

Information available via the system to particular users may be based on user types. For example, a first set of information may be available to first responders (e.g., occupants of the home, alert status of safety sensors in the home), while a second set of information may be available to a short term renter (e.g., a passcode for automatic door locks, contact information for local emergency services, property use rules, checkout procedures, local restaurant suggestions), and a third set of information may be available to a property caretaker (e.g., a description of the last time the property was cleaned, a list of recent short term renters, descriptions of complaints or maintenance issues noted by recent short term renters, schedules and instructions for watering plants, schedules or instructions for maintaining a pool or hot tub). User types may be determined by a user device (e.g., a renter may be identified as a renter-user based upon a software application and/or website authentication process on their phone that validates that device as being associated with the current renter), access code (e.g., a caretaker may enter a password via a user interface of a beacon device that validates that user as a caretaker-user), or the context of the situation (e.g., when the system is in an alert or alarm mode due to a detected external alarm, every beacon or device may default to a first responder user type).

For such implementations, the system may communicate with one or more third party services for information and/or authentication of user types. As an example, a web platform providing short term rental search and reservation may communicate with the platform and provide the identity of short-term renters that have reserved the property during any time frame, which may be used to automatically update the occupancy information stored by the system and used by first responders during rescue scenarios. In this manner, the system may automate the process of maintaining and updating occupancy information through a plurality of different occupants so that current occupancy will be available in the event of an emergency without first responders needing to contact the property owner.

As another example, a third party platform for short term rentals, or on-demand property cleaning, may provide information to the system to aid in authentication of user types for visitors to the property. This may include providing information usable to verify a user as a renter-user so that the system may provide a door access code or other renter specific information, or providing information usable to verify a user as a caretaker-user so that the system may provide a door access code, cleaning and care instructions, and other caretaker specific information.

Expanding upon the above example, implementations of the system may also provide information for house-sitters (e.g., instructions for mail collection, garbage collection), pet-sitters (e.g., instructions on feeding and care, veterinary care contact information), maintenance and repair providers (e.g., descriptions of locations of circuit breakers, gas appliances, or other appliances in the home), and others that may visit a residence from time to time and may benefit from a readily accessible and remotely maintainable repository of information.

Figure 12A:
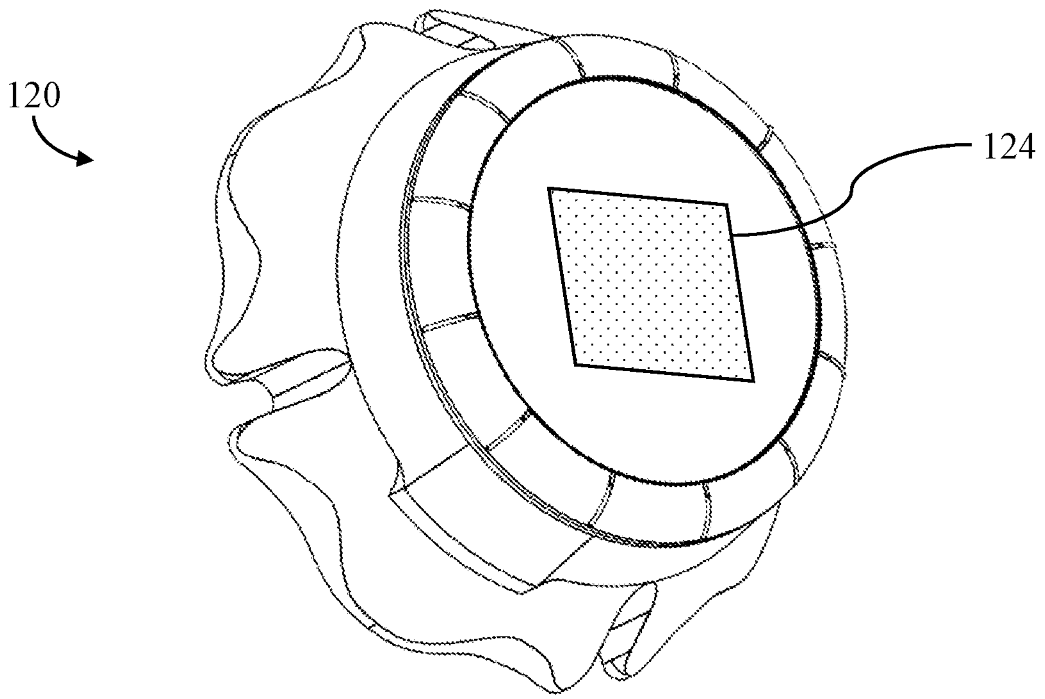
FIG. 12A is a front perspective view of an alternate exemplary rescue beacon that provides an optical code in place of a display.
Figure 12B:
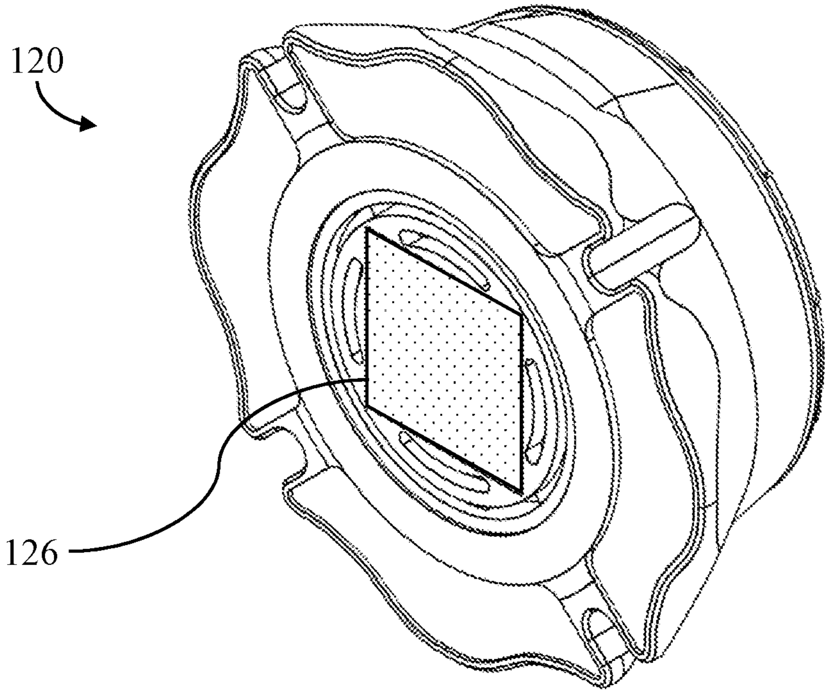
FIG. 12B is a rear perspective view of the rescue beacon of 12A.
Figure 12C:
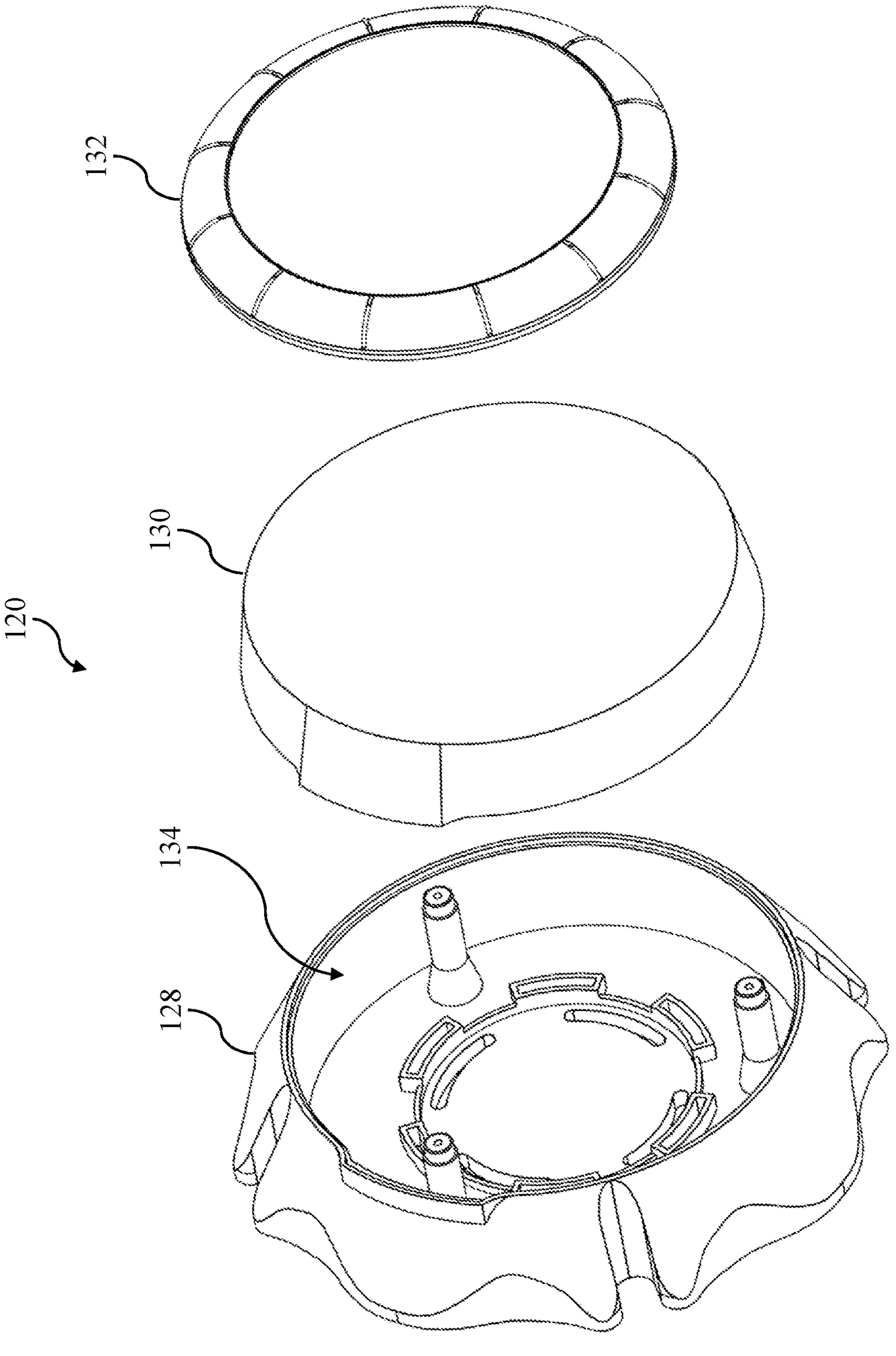
FIG. 12C is an exploded view of the rescue beacon of 12A.

FIGS. 12A through 12C show an alternate implementation of a rescue beacon (120) that may be used as an alternative to, or in addition to, a rescue beacon or rescue tag such as that described in FIGS. 2-5. The rescue beacon (120) shares many of the same features and functions other rescue beacons disclosed herein, and may be used interchangeably with respect to the diagrams and processed described in FIGS. 8A through 11B. The rescue beacon (120) may have the same or a different visual design as compared to prior rescue beacons, and may include some or all of the same internal electrical components as illustrated in FIGS. 6 and 7.

FIG. 12C shows an exploded view of the rescue beacon (120), including a back plate (128) that may be mounted to a wall, window, or other surface, and that defines in interior (134) which contains electrical and functional components such as those shown in FIGS. 6 and 7. A cover plate (130) fixes to the back plate (128) to cover and protect the interior (134). A code plate (132) may be fixed to the cover plate (134) and may have the optical code (124) affixed thereto. The code plate (132) may be removable and replaceable without dismounting the rescue beacon (120).

The rescue beacon (120) is distinct from prior disclosed rescue beacons in that the rescue beacon (120) omits the display (206) in favor of a set of optical codes (124, 126) present on the front and back of the rescue beacon (120), which may be interacted with by a device such as a smartphone or other mobile computing device in order to gain information from the system. Further, the rescue beacon (120) may be configured to be semi-permanently attached to a mounting surface (e.g., by mounting screws, adhesives, or other fixture means) and may not be intended to be removed and used by a first responder in a rescue scenario, as has been described above. Instead, a first responder may use a user device to scan either of the optical codes (124, 126), which may be accessible outside the home and inside the home, such as when the rescue beacon (120) is mounted on a window, and then may rely entirely on their user device to gain information from the system, instead of maintain control of the rescue beacon (120) while they perform rescue duties, as has been described above.

In this manner, information that has been described above as being available via the rescue beacon (102) (e.g., visual or audio indications of occupants within the home) may additionally or alternatively be available via the user device after interacting with the optical codes (124, 126). As will be understood by those skilled in the art, the optical codes may be, for example, QR codes, barcodes, or other optically encoded information sets, and such information sets may also or alternatively be available via RFID, NFC, or other short range wireless protocol.

When information is received by a user device interacting with a code (124, 126), the information is configured to be used by the user device to open a web location (e.g., a web address or other unique address) and display received information from that web location, which may be, for example, a URL that is uniquely associated with the particular rescue beacon (120), or a particular household in which the rescue beacon (120) is located, as has already been described as a dashboard above.

Figure 13:
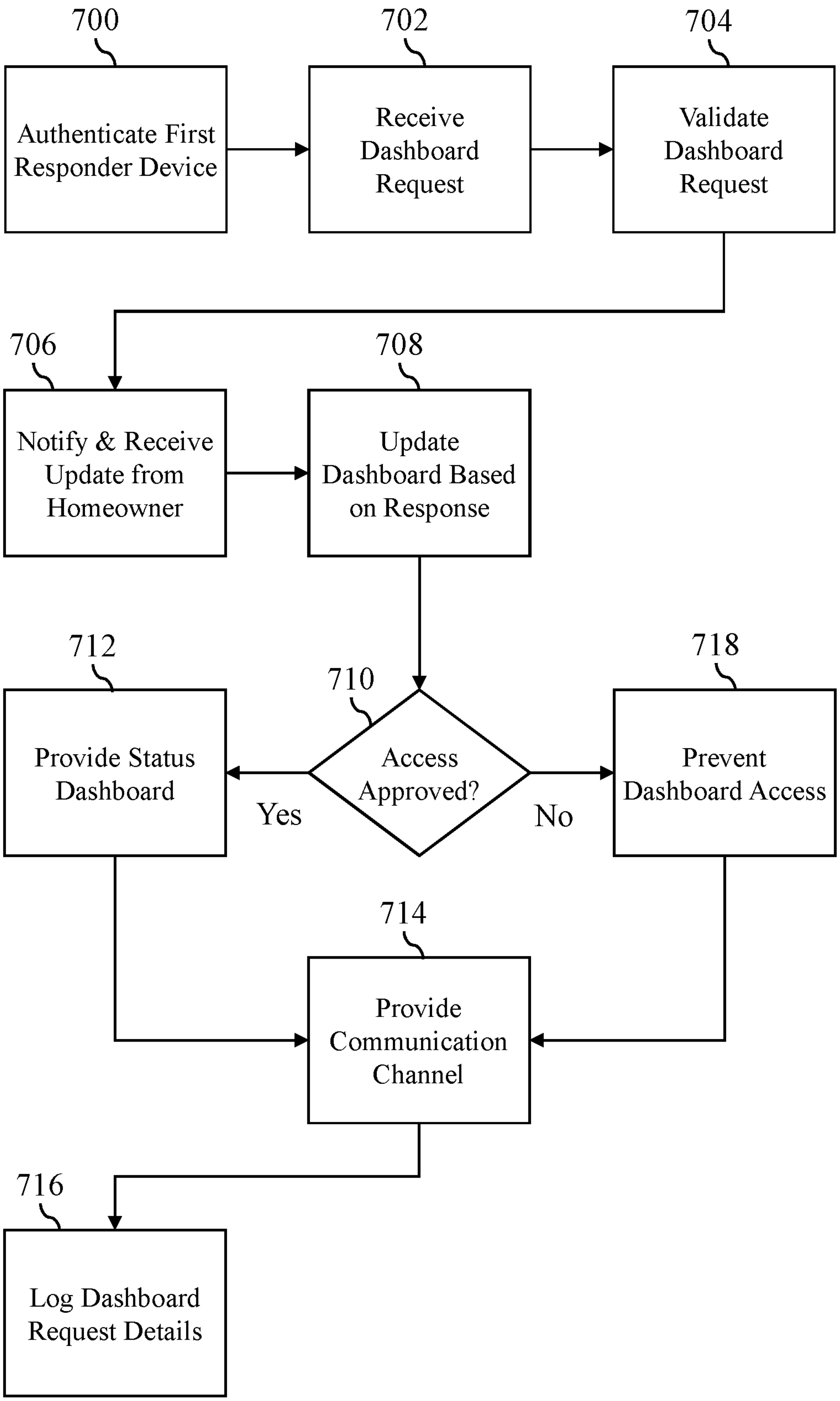
FIG. 13 is a flowchart of a set of steps that could be performed with an occupancy information system to provide information on occupants at a location.

FIG. 13 shows a set of steps that may be performed with an occupancy information system to provide an occupancy dashboard to first responders via a user device such as the first responder device (110). The system may be configured to only allow certain user devices to receive and access information via a dashboard, and only under certain conditions. In this manner, a rescue beacon with a scannable optical or wireless code (124, 126) may be placed outside the home, or visible from outside the home, without concerns that a bad actor may use or access the system or a homeowner's dashboard information for fraudulent purposes. Such configurations may include authenticating (700) user devices as first responder devices at a time prior to attempting to access the dashboard information. This may be accomplished in various ways, and may include providing a mobile application or website interface that a first responder may request authentication through (e.g., by providing identifying information that verifies them as a first responder, or by providing a unique code from a set of codes that may be distributed to first responders) or otherwise log into using private credentials such as a username and password, or may include whitelisting ranges of IP addresses that are assigned to first responder user devices, or other pre-configurable authentications. In some implementations, a software application that manages equipment or personnel resources for a first responder organization may be configured to regularly determine the IP addresses or other identifying information of the organization's personnel, and report that information to a device such as the remote server (100) for authentication purposes.

When the remote server (100) receives a dashboard request (702) (e.g., as a result of a user device scanning a code (124, 126) and requesting an associated web address), the server (100) may first validate (704) the request before providing any dashboard information. Validation (704) of the request may include validating that the user device has been authenticated (700), and may include verifying authentication of a mobile app, verifying an IP address or other identifying information of the user device, verifying authentication information stored in a browser cookie, or other steps. Validation (704) may also include matching a location associated with the scanned beacon code with location information provided by the requesting device (e.g., if a certain beacon code is associated with 123 Sample Street, Cincinnati, Ohio, then location information from the user device's GPS or other location sensor may be obtained and verified against the street address).

Once the request is validated (704), the system may provide a notification (706) to one or more homeowner user devices that are associated with the requested dashboard, and may receive one or more responses or updates from the notified devices. This may include, for example, providing a text message, email message, mobile app notification, automated voice call, or other automated electronic message to the associated devices. Such notification may prompt the device for a response, which may include selecting predefined options from a mobile app interface, providing voice or telephone keypad responses, or providing pre-defined responses to text or email messages (e.g., "Respond with 1 to grant dashboard access, respond with 0 to refuse dashboard access"). Responses received (706) from the homeowner may include granting dashboard access, refusing dashboard access, indicating a number of current occupants in the home, indicating the nature of occupants in the home, and other information.

The system may then update (708) the information available via the dashboard, such as to indicate that the home normally has 5 total occupants, but that currently only a dog is present in the home. If access to the dashboard is approved (710) based on the homeowner's response (706) and/or other circumstances surrounding the request, the system may then either provide (712) the status dashboard or prevent (718) access to the status dashboard via the first responder's user device that request access. Where access is provided (712), the dashboard may display on the first responder's user device (e.g., via a web browser or mobile app) and provide information as has been described. Where access is prevented (718), the first responder may instead receive a limited subset of dashboard information, or a simple message indicating that access has been denied.

In addition to providing or preventing dashboard access based on a homeowner response, the system may also be configured to automatically grant or prevent access in some scenarios. For example, some homeowners may prefer that all dashboard access be pre-approved in all scenarios, while some homeowners may prefer that dashboard access be automatically granted, without real-time approval, in all scenarios. Additional configurations may include, for example, automatic approval or denial based upon the time of day or day of week, automatic approval or denial based upon location information from a homeowner user device (e.g., automatic approval where the homeowner user device GPS indicates that the homeowner is not at the residence), automatic approval or denial based upon an alarm status of the rescue beacon or another device within the home (e.g., dashboard may be automatically approved if a current fire alarm status exists), or other configurations.

In either case, the system may also be configured to provide (714) a communication channel between the first responder user device and one or more of the homeowner devices, if consented to by one or both parties. This may include initiating a voice or video communication channel between mobile applications on the first responder and homeowner user devices, initiating a telephonic call between the parties, or initiating an electronic message conversation between the parties. This channel (714) may allow the parties to communicate in real time while also providing each party a level of privacy (e.g., telephone or SMS based channels may go through an intermediary that anonymizes telephone numbers). This may allow the homeowner to provide real time assistance and information during rescue operations, or may allow the homeowner to speak to the first responder so that they can understand the circumstances around a dashboard access request and perhaps approve a request that was previously denied. This communication channel (714) may be established between the homeowner user device and the first responder user device that requested the dashboard, or may between the homeowner user device and a first responder call center or coordinator who has information about the emergency and may be in communication with the first responders at the scene.

In either case, the system may then log (716) information relating to any dashboard request, such as the time, day, and location of the request, as well as information about the user device making the request, a username, password or account associated with the requesting device, whether the request was validated or not, any responses or additional communications between the homeowner and the first responder, and other information. This logged (716) information may be reviewed by a homeowner and/or first responders to determine how to better interact with the system, and to provide information that may be useful in identifying and preventing fraudulent use of the system.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A home occupancy information system comprising:

(a) a beacon code scanner;

(b) a rescue beacon comprising an alarm sensor configured to detect an alarm state produced in response to detection of a home emergency condition and a beacon code configured to provide a beacon identifier when scanned by the beacon code scanner;

(c) a server comprising a processor, wherein the server is in communication with the beacon code scanner and is configured to store:

- (i) a plurality of home datasets, wherein each home dataset is associated with a home, one or more beacon identifiers of rescue beacons configured at the home, and an occupant dataset that describes one or more occupants of the home; and
- (ii) a first responder dataset that describes a plurality of authenticated first responders;

wherein the processor is configured to:

- (i) receive a dashboard request from the beacon code scanner, the dashboard request comprising the beacon identifier and an authenticated first responder identifier;
- (ii) validate an authenticated first responder based on the authenticated first responder identifier and the first responder dataset;
- (iii) identify a home dataset of the plurality of home datasets based on the beacon identifier; and
- (iv) provide a dashboard dataset to the authenticated first responder based on the occupant dataset for the home dataset, wherein the dashboard dataset is configured to cause the authenticated first responder to receive a status dashboard, wherein the status dashboard comprises a description of each occupant of the home based on the occupant dataset.

2. The system of claim 1, wherein the produced alarm state comprises one or more of an audible alarm signal and an encoded wireless alarm signal, and the alarm sensor comprises one or more of a microphone and an encoded wireless signal receiver.

3. The system of claim 1, wherein the rescue beacon further comprises a visual indicator configured to provide a visual indication that the alarm state has been detected; wherein the visual indicator comprises an LED indicator, and wherein the beacon code comprises one or more of an optical code and a wireless signal transmitter.

4. The system of claim 1, wherein the processor is further configured to, before providing the dashboard dataset to the authenticated first responder:

- (i) provide a notification to one or more homeowner devices that are associated with the home dataset;
- (ii) receive a confirmation from the one or more homeowner devices approving access to the status dashboard; and
- (iii) only provide the dashboard dataset in response to receiving the confirmation from the one or more homeowner devices.

5. The system of claim 4, wherein the processor is further configured to, when providing the notification to the one or more homeowner devices, provide information usable by the one or more homeowner device to establish a real-time communication channel with the authenticated first responder, an authenticated first responder administrator, or both, wherein the real-time communication channel comprises one or more of audio communication, video communication, or electronic message communication.

6. The system of claim 1, wherein the home dataset comprises a set of access rules, wherein the processor is further configured to, before providing the dashboard dataset to the authenticated first responder:

- (i) evaluate each of the set of access rules to determine whether they pass or fail; and
- (ii) only provide the dashboard dataset where no access rule fails.

7. The system of claim 6, wherein the set of access rules comprises a location rule that fails if a first set of location information produced by a location sensor of the beacon code scanner of the authenticated first responder does not substantially match a second set of location information stored in the home dataset.

8. The system of claim 6, wherein the set of access rules comprises a temporal rule that fails based on the time that the dashboard request is received and a set of preconfigured approved times.

9. The system of claim 1, wherein the processor is further configured to, before providing the dashboard dataset to the authenticated first responder:

- (i) provide a notification to one or more homeowner devices that are associated with the home dataset;
- (ii) receive an occupancy update from the one or more homeowner devices, wherein the occupancy update indicates a number of immediate occupants that are present within the home at that time; and
- (iii) provide the dashboard dataset to the authenticated first responder based on the occupant dataset and the occupancy update, wherein the status dashboard comprises a description of each occupant of the home and the number of immediate occupants based on the occupant dataset and the occupancy update.

10. The system of claim 1, further comprising a rescue tag comprising a tag alarm sensor configured to detect the alarm state, a tag visual indicator configured to provide a visual indication that the alarm state has been detected, a tag audio indicator configured to provide an audible indication that the alarm state has been detected, and a tag fastener configured to attach the rescue tag to an occupant within the home.

11. The system of claim 1, wherein the rescue beacon comprises:
(a) a body having a first surface and a second surface opposite the first surface;
(b) an adhesive ring on the first surface; and
(c) the beacon code comprises a first optical code presented on the first surface and second optical code presented on the second surface, such that the rescue beacon may be affixed to a window of the home by the adhesive ring and the beacon code may be viewed from either side of the window.

12. The system of claim 1, wherein the status dashboard comprises:
(i) a preconfigured description of whether each occupant is a human or an animal;
(ii) a preconfigured image of each occupant; and
(iii) a preconfigured description of where each occupant can primarily be found within the home.

13. A method of utilizing a home occupancy information system during a home emergency condition, the method comprising:
providing a beacon code scanner;
providing a rescue beacon comprising an alarm sensor configured to detect an alarm state produced in response to the home emergency condition and a beacon code configured to provide a beacon identifier when scanned by the beacon code scanner;
providing a server comprising a processor, wherein the server is in communication with the beacon code scanner and is configured to store:
(i) a plurality of home datasets, wherein each home dataset is associated with a home, one or more beacon identifiers of rescue beacons configured at the home, and an occupant dataset that describes one or more occupants of the home; and
(ii) a first responder dataset that describes a plurality of authenticated first responders;
receiving, at the processor, a dashboard request from the beacon code scanner, wherein the dashboard request comprises the beacon identifier and an authenticated first responder identifier;
validating, by the processor, an authenticated first responder based on the authenticated first responder identifier and the first responder dataset;
identifying, by the processor, a home dataset of the plurality of home datasets based on the beacon identifier; and
providing, by the processor, a dashboard dataset to the authenticated first responder based on the occupant dataset for the home dataset, wherein the dashboard dataset is configured to cause the authenticated first responder to receive a status dashboard, wherein the status dashboard comprises a description of each occupant of the home based on the occupant dataset.

14. The method of claim 13, further comprising:
providing, by the processor, a notification to one or more homeowner devices that are associated with the rescue beacon;
receiving, at the processor, an occupancy update from the one or more homeowner devices, wherein the occupancy update indicates a number of immediate occupants that are present within the home at that time; and
displaying, at the rescue beacon, a beacon dashboard including a description of the number of immediate occupants based on the occupant update.

15. The method of claim 14, further comprising:
providing a rescue tag, the rescue tag comprising a tag alarm sensor configured to detect the alarm state, a tag visual indicator configured to provide a visual indication that the alarm state has been detected, a tag audio indicator configured to provide an audible indication that the alarm state has been detected, a wireless signal transmitter, and a tag fastener configured to attach the rescue tag to an occupant within the home.

16. The method of claim 15, further comprising:
providing two or more triangulation beacons positioned within the home, wherein the triangulation beacons are configured to:
(i) receive signals from the wireless signal transmitter of the rescue tag;
(ii) determine location information of the rescue tag relative to the two or more triangulation beacons; and
(iii) provide the location information of the rescue tag to the rescue beacon;
wherein the beacon dashboard includes a location of the rescue tag relative to the rescue beacon based on the location information.

17. The method of claim 16, further comprising:
producing a virtual mapping of the rescue tag's location over a period of time based on the location information;
determining a location of the rescue tag at a moment in time based on the location information and the virtual mapping; and
displaying, at the rescue beacon, the beacon dashboard to include the location of the rescue tag at the moment in time.

18. A home occupancy information system comprising:
(a) a rental party beacon code scanner;
(b) a beacon comprising a beacon code configured to provide a beacon identifier when scanned by the rental party beacon code scanner;
(c) a server comprising a processor, wherein the server is in communication with the rental party beacon code scanner and is configured to store a plurality of home datasets, wherein each home dataset is associated with a home, one or more beacon identifiers of rescue beacons configured at the home, a renter information dataset that describes a passcode usable by a rental party during a select period of time such as to allow the rental party to access the home and a set of rules for the rental party to follow while using the home; and wherein the processor is configured to:
(i) receive a dashboard request from the rental party beacon code scanner, the dashboard request comprising the beacon identifier and a rental party information dataset that describes an occupancy update which indicates a number of immediate occupants that will be present within the home during the period of time; and
(ii) validate the rental party beacon code scanner based on the rental party information dataset.

19. The home occupancy information system of claim 18, wherein the server is further configured to store a first responder dataset that describes a plurality of authenticated first responders; and wherein the processor is further configured to:
(i) receive a dashboard request from a first responder beacon code scanner, the dashboard request comprising the beacon identifier and an authenticated first responder identifier;

(ii) validate an authenticated first responder based on the authenticated first responder identifier and the first responder dataset; and (iii) provide a dashboard dataset to the authenticated first responder based on the rental party information dataset.

20. The home occupancy information system of claim 18, wherein the beacon comprises an alarm sensor configured to detect an alarm state produced in response to detection of a home emergency condition.

* * * * *